G. H. CHINNOCK.
VEHICLE TIRE.
APPLICATION FILED SEPT. 3, 1912.
1,131,772. Patented Mar. 16, 1915.
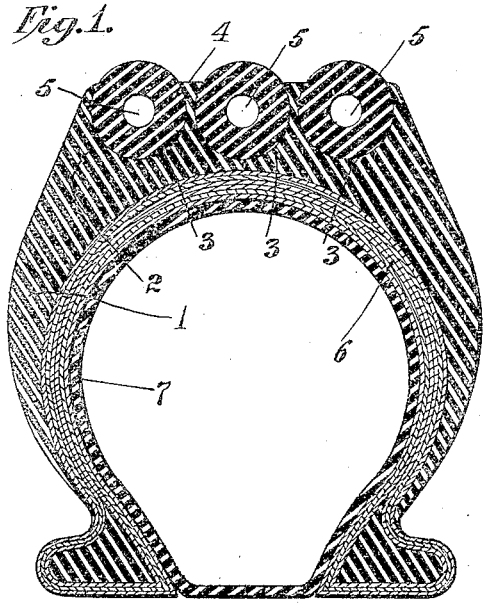
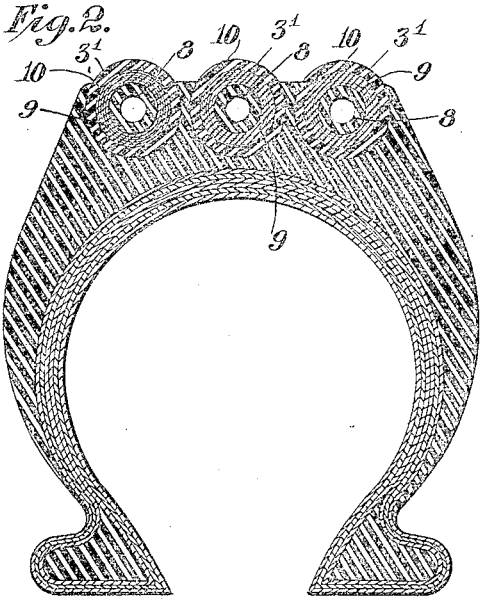
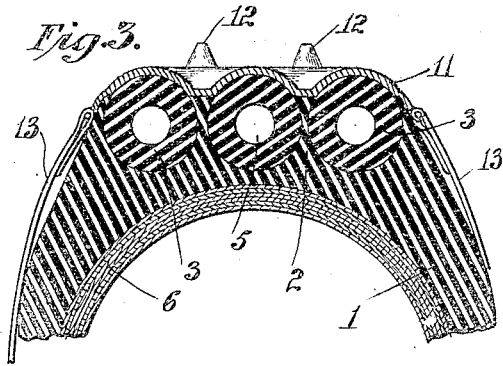
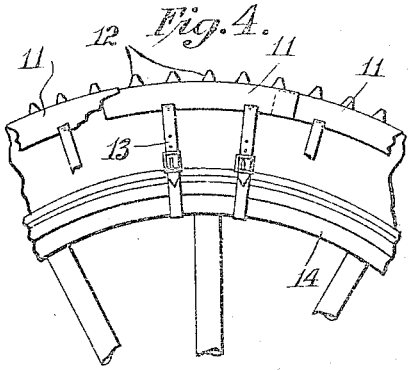
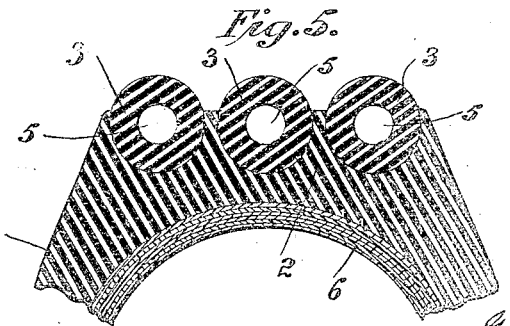

UNITED STATES PATENT OFFICE.

GEORGE H. CHINNOCK, OF NEW YORK, N. Y.

VEHICLE-TIRE.

1,131,772.　　　　Specification of Letters Patent.　　Patented Mar. 16, 1915.

Application filed September 3, 1912. Serial No. 718,380.

*To all whom it may concern:*

Be it known that I, GEORGE H. CHINNOCK, a citizen of the United States of America, and a resident of the borough of Brooklyn, city of New York, county of Kings, and State of New York, have invented certain new and useful Improvements in Vehicle-Tires, of which the following is a specification.

My invention relates to vehicle tires, and comprises cushion tubes embedded in the tread of an ordinary rubber tire, and projecting in part above the main outer layer of rubber of such tire, so forming a tread surface comprising a plurality of peripheral ribs separated by grooves.

The objects of my invention are to avoid skidding; to substantially avoid tire puncturing; to provide a tire which, while having relatively great thickness in the vicinity of the tread, shall be quite flexible and, therefore, resilient; and generally to provide an improved tire possessing the advantages above set forth, which may be constructed readily and at moderate expense.

In the accompanying drawings I have illustrated my invention as applied to a pneumatic tire of the double-tube type, the invention being of particular value and advantage in connection with such pneumatic tires; but it will be understood that my invention in its broader aspects is not restricted to use in connection with double tube tires or in connection with pneumatic tires.

I will now proceed to describe my invention with reference to the accompanying drawings, in which—

Figure 1 shows a cross section of the shoe of a double-tube pneumatic tire, such shoe being provided with cushion tubes in its tread portion in accordance with my invention; Fig. 2 is a view similar to Fig. 1 showing an alternative construction of a cushion tube which may be employed; Fig. 3 is a fragmentary section similar to Fig. 1, but showing a tire armor applied to the tire; Fig. 4 is a fragmentary side view of a wheel provided with a tire constructed in accordance with my invention, and with a tire armor; Fig. 5 shows a fragmentary section of a tire having cushion tubes according to my invention, this view showing the cushion tubes projecting to a greater extent than in the preceding views.

Referring now to the drawings, and first to Fig. 1 thereof, numeral 1 designates a shoe of a pneumatic tire, which shoe is in general of ordinary construction except as to the features hereinafter referred to; and 2 designates the outer or thick rubber layer of the shoe forming the main portion of the tread. In this rubber layer 2 forming the main portion of the tread are embedded cushion tubes 3 in such manner that a portion of each tube 3 projects beyond the periphery 4 of the rubber layer 2. These cushion tubes 3 are preferably of rubber, or of rubber and fabric, (see Fig. 2) and are hollow, 5 designating the bore or hollow space of each such tube. These tubes 3 are each similar to the so-called "cushion tires" heretofore in common use on bicycles and other vehicles, and are formed of rubber of such composition and vulcanized to such degree, that they have high load-carrying capacity as well as elasticity and resilience. These tubes 3 are embedded in the gum layer 2 at the time of application of such gum layer 2 to the fabric carcass 6 of the shoe 1, so that when the gum layer 2 is vulcanized the rubber of the cushion tube 3 is united with the rubber layer 2, becoming in effect a part thereof, so that in the resulting shoe these tubes 3 are very firmly united to the rubber 2, and become in effect a part thereof. Nevertheless, since the tubes 3 are hollow, and composed of rubber which is highly elastic and resilient, they have a very effective cushioning action in use, which action is quite independent of the cushioning action due to inflation of the inner tube 7 of the tire, and hence permit high inflation of such inner tube 7 (such high inflation being desirable since it adds greatly to the durability of the tire), the tire as a whole being relatively soft due to the cushioning action of these tubes 3. The said tubes 3 also act effectively to prevent lateral slipping, commonly termed "skidding," since it is well known that a tire having peripheral ribs, such as are formed by the exposed surfaces of these tubes 3, very effectively resists side slipping or skidding. In action, the exposed portions of these tubes 3 flatten considerably and for that reason obtain a very effective grip upon the road surface. They also tend to prevent puncture of the tire since a tire formed as shown in Fig. 1 has a very thick tread portion, which can be pierced only with great difficulty, and only by a long nail or the like. No ordinary cutting such as is ordinarily experienced from ordinary pieces of glass on a roadway, or from sharp stones, can penetrate this thick tread portion of the tire. It is not ordinarily considered practicable to provide a tire with as thick a tread portion as indicated in Fig. 1, because an ordinary tread portion, if as thick proportionately as shown in Fig. 1, will not be sufficiently flexible; but by reason of the air spaces 5 formed in the tubes 3, these tubes are quite flexible; and because these tubes divide the tread portion of the rubber layer 2 of the shoe, such shoe is in itself quite flexible. It will be noted that the cushion tubes 3 are embedded in the rubber layer 2 to beyond the center lines of these tubes; the intervening portions 4 of the rubber layer 2, therefore, forming keys to hold the tubes 3 in place.

The tubes 3 need not be formed of solid rubber as shown in Fig. 1, but may be formed, instead, of rubber and fabric. This is illustrated particularly in Fig. 2, wherein the cushion tubes there shown and there designated by numerals $3^1$, comprise each an inner layer of soft rubber 8, a layer of rubber saturated fabric 9, and an outer layer of rubber 10. It will thus be seen that the tire of the present invention has a thick and relatively broad tread portion having a plurality of hollow ribs on the outside of the tread and extending all the way around the tire. Since the hollow tubes are vulcanized in place with the rubber extending between them to beyond their centers, the resulting tire has its tread portion in the form of an integral structure with the hollow portions of the ribs embedded in the tread so that the rubber extends between the hollow portions. As a result the flattening of the tread causes a compression of the rubber between the hollow ribs, thus forming an independent resilient portion of the tire.

The tire as illustrated in Figs. 1 and 2 constitutes a complete tire; but when the tire is to be used on muddy or slippery roads I preferably provide it with an armor comprising a series of over-lapping metal plates 11 provided, as shown particularly in Fig. 3, with grooves adapted to receive the projecting portions of the tubes 3; the plates 11 being thereby interlocked with the shoe 1 against lateral displacement; and these plates 11 may be conveniently provided with projecting spurs 12 adapted to penetrate into the roadway, and thereby prevent rotary slipping of the wheel. These plates 11 may be secured to the wheel rim in any suitable manner, one convenient means for the purpose being straps 13 passing beneath the rim 14 of the wheel. Since each of these plates 11 subtends only a small angle, and since the several plates 11 are movable separately from one another, they do not decrease materially the flexibility or resilience of the tire, but they do effectively prevent puncture and cutting of the tread of the tire, and also insure ample adhesion to the roadway, even when the latter is slippery or icy. These plates 11 are also very readily attached to the wheel. In general, in attaching these armor plates 11, the tire will be slightly deflated, the plates 11 put in place and the straps 13 drawn up, and then the tire will be inflated fully thus expanding the shoe 1 and putting the straps 13 under sufficient tension to insure that the armor plates shall adhere firmly to the tread surface of the tire and so shall not slip.

The extent to which the cushion tubes may project beyond the tread portion of the rubber layer 2 may be varied within considerable limits, according to the preference of the tire maker. In Fig. 5 I have shown a tire wherein said tubes project much farther than in the construction shown in Figs. 1 and 2.

What I claim is:

1. A pneumatic tire such as described comprising a pneumatic tire body having a thick and relatively wide tread portion, and a plurality of hollow elastic tubes embedded in said tread portion to beyond the centers of said tubes and integrally united with said tread and projecting therefrom to form circumferential ribs on the exterior of such tread, said ribs being elastic and compressible independently of the elasticity and compressibility of the tire as a whole.

2. A pneumatic tire such as described comprising a pneumatic tire body having a thick and relatively wide tread portion of rubber, and a plurality of hollow cushion tubes of curvilinear section and of elastic material embedded in said tread portion to beyond their centers and integrally united with said tread portion and projecting therefrom to form circumferential ribs on the exterior of such tread, the rubber of such tread extending around both sides of each of said tubes and beyond the centers of the tubes and locking the same in place, and said tubes forming the bearing surface of the tread with the weight distributed over the different tubes.

3. A vehicle tire having a tread portion of elastic material provided with a plurality of hollow peripheral ribs of elastic material projecting from the outside thereof, the hollow portions of said ribs being below the surface of the tread and being laterally supported thereby, and said ribs and tread being united by vulcanization into an integral structure, said ribs being elastic and compressible independently of the elasticity and compressibility of the tire as a whole.

4. A pneumatic tire having a thick and relatively wide tread portion provided with a plurality of hollow peripheral ribs of elastic material projecting from the outside thereof, the hollow portions of said ribs being below the surface of the tread and being laterally supported thereby, and said ribs and tread being united by vulcanization into an integral structure, said ribs being elastic and compressible independently of the elasticity and compressibility of the tire as a whole.

In testimony whereof I have signed this specification in the presence of two subscribing witnesses.

GEORGE H. CHINNOCK.

Witnesses:
H. M. MARBLE,
PAUL H. FRANK.